(12) United States Patent
Gold et al.

(10) Patent No.: US 11,359,769 B2
(45) Date of Patent: Jun. 14, 2022

(54) GAS CARTRIDGE LOADED DISPENSING DEVICE

(71) Applicant: BreakEats LLC, Sunnyvale, CA (US)

(72) Inventors: Ezra Robert Gold, Sunnyvale, CA (US); Robert James Fanfelle, San Carlos, CA (US)

(73) Assignee: BREAKEATS LLC, Sunnyvale, CA (US)

( * ) Notice: Subject to any disclaimer, the term of this patent is extended or adjusted under 35 U.S.C. 154(b) by 100 days.

(21) Appl. No.: 16/959,953

(22) PCT Filed: Jan. 2, 2019

(86) PCT No.: PCT/US2019/012102
§ 371 (c)(1),
(2) Date: Jul. 2, 2020

(87) PCT Pub. No.: WO2019/136102
PCT Pub. Date: Jul. 11, 2019

(65) Prior Publication Data
US 2021/0010644 A1    Jan. 14, 2021

Related U.S. Application Data

(60) Provisional application No. 62/613,028, filed on Jan. 2, 2018.

(51) Int. Cl.
*F17C 13/08* (2006.01)
*F17C 13/06* (2006.01)

(52) U.S. Cl.
CPC ............ *F17C 13/084* (2013.01); *F17C 13/06* (2013.01); *A23C 2210/30* (2013.01);
(Continued)

(58) Field of Classification Search
CPC .... A23C 2210/30; F17C 13/084; F17C 13/06; F17C 2201/0109; F17C 2201/058;
(Continued)

(56) References Cited

U.S. PATENT DOCUMENTS 1,138,248 A    5/1915  Read
2,324,648 A *  7/1943  Roeder ................. A47J 43/121
                                              222/464.1
(Continued)

FOREIGN PATENT DOCUMENTS

EP         3187630 A1    7/2017
GB          908345 A    10/1962
WO       1994006140 A1    3/1994

OTHER PUBLICATIONS

International Search Report for PCT Application PCT/US2019/012102, dated Apr. 15, 2019.
(Continued)

*Primary Examiner* — Nicolas A Arnett
(74) *Attorney, Agent, or Firm* — Rowan TELS LLC

(57) ABSTRACT

A cartridge loader includes a lever arm, a hinge axle and a cam centered on the hinge axle, and a housing for receiving a cartridge, the housing having a first end and a second end, the first end adapted to connect to an appliance, and the second end adapted to allow the lever arm to open and close, the housing having an aperture exposing an interior of the housing, the aperture shaped to receive the cartridge and the lever arm, wherein the cam is adapted to assist in seating the cartridge in the housing when the lever arm is closed, and ejecting the cartridge when the lever arm is opened.

18 Claims, 13 Drawing Sheets

(52) U.S. Cl.
CPC ............. *F17C 2201/0109* (2013.01); *F17C 2203/0636* (2013.01); *F17C 2205/0173* (2013.01); *F17C 2205/0192* (2013.01); *F17C 2205/032* (2013.01); *F17C 2221/013* (2013.01); *F17C 2260/036* (2013.01); *F17C 2270/0736* (2013.01)

(58) Field of Classification Search
CPC ...... F17C 2203/0636; F17C 2205/0173; F17C 2205/0192; F17C 2205/032; F17C 2221/013; F17C 2270/0736; F17C 2270/07; F17C 2270/0745
See application file for complete search history.

(56) References Cited

U.S. PATENT DOCUMENTS

| | | | | |
|---|---|---|---|---|
| 3,999,534 A | * | 12/1976 | Chapin | F41B 11/62 124/74 |
| 4,344,410 A | | 8/1982 | Curran | |
| 6,029,645 A | * | 2/2000 | Wonisch | F41B 11/62 124/74 |
| 7,730,882 B2 | * | 6/2010 | Liu | F41B 11/62 124/74 |
| 7,757,682 B2 | * | 7/2010 | Kaminker | F41B 11/62 124/74 |
| 8,550,061 B2 | * | 10/2013 | Maeda | F41B 11/62 124/56 |
| 10,295,303 B2 | * | 5/2019 | Buys | F41B 11/62 |
| 10,473,269 B2 | * | 11/2019 | Gisin | F17C 7/00 |
| 2014/0239522 A1 | | 8/2014 | An et al. | |
| 2018/0193855 A1 | * | 7/2018 | Pochtler | B05B 7/2429 |

OTHER PUBLICATIONS

Written Opinion of the ISA for PCT Application PCT/US2019/012102, dated Apr. 15, 2019.

* cited by examiner

GAS CARTRIDGE LOADED DISPENSING DEVICE

CROSS REFERENCE TO RELATED APPLICATIONS

This application claims priority and benefit as a National Stage application under 35 U.S.C. 371 of international application serial no. PCT/US19/12102, filed on Jan. 2, 2019, titled "GAS CARTRIDGE LOADED DISPENSING DEVICE", which claims priority to U.S. application Ser. No. 62/613,028, filed on Jan. 2, 2018, each of which is incorporated by reference herein in their entirety.

BACKGROUND

This disclosure generally relates to devices for attaching cylinders of compressed materials to appliances.

Cartridges containing pressurized gas or liquids are used in many devices. These cartridges are common and can be used to provide pressurized gas or liquids for use in inflating balloons, firing BBs from BB guns to aerating delectable edibles such as whipped cream. Devices that utilize these cartridges typically contain a pin to puncture the cartridge to release its contents, and use a mechanism to drive the cartridge into the pin. Once the sealing mechanism of the cartridge is punctured, the contents of the cartridge is utilized by the device.

In U.S. Pat. No. 3,999,534, entitled Gas Operated Rifle, there is a lever arm with a cam and cam surfaces to operate a spring loaded piston, the piston has a shaped head to hold a cartridge in place after its loaded. Releasing the piston allows the cartridge to be removed. The cartridge may be manually removed or a separate element may be actuated to lift the cartridge out of the rifle stock.

In U.S. Pat. No. 3,630,151, entitled Manually Actuated Fluidic Igniter, a lanyard is used to pull a cam lever arm, depress a cartridge against a pin. The pin punctures the cartridge to release gas into oscillating wave chamber. Oscillations produce heat, which ignite a pyrotechnic explosive, and a solid grain propellant. The device is used to ignite things, like rocket motors. The cartridge is manually removed once the contents are spent.

In U.S. Pat. No. 4,787,575 entitled Signal Balloon Device, there is a container holding gas cartridges in an emergency signal device to inflate a signal balloon. Cartridges are loaded into a storage box and can be used to inflate a balloon by a lever arm and cam action that push the cartridges into a puncture device and feeding gas to the balloon. Once the cartridge is spent, the cartridge is manually removed.

In U.S. Pat. No. 2,190,688, entitled Food Products Aerating and dispensing device, there is a cartridge holder to accommodate a cartridge, threaded into a receiving base. The threads are high pitch, to allow maximum axial displacement with minimum rotation, to reduce gas leakage while cartridge is advanced into puncture and sealing mechanism position.

These technologies are still in use today. One need only visit a local restaurant or café to see whipped cream dispensers using a screw thread container for attaching gas cylinders to whipped cream dispensers. Each time the cartridge is spent, the screw thread container is manually unscrewed, the cartridge discarded, and a new cartridge inserted to be manually screwed to the dispensing device again.

There are inherent inefficiencies and risks associated with the way cartridges containing compressed gas or liquids are loaded and unloaded:

The proper alignment of the threads can be challenging. Misalignment of the threads can prevent loading of the cartridge or damage the equipment to be charged.

Repeated rotational movement of small diameter objects, such as screwing the cartridge toward and away from the pin, may be a source of repetitive strain injury.

The cartridge holder can be easily lost or misplaced.

The screwing action relies upon friction and grip strength to overcome the forces of threading the cartridge and puncturing the cartridge. Common environmental factors such as moisture, food or grease can reduce the friction between the cartridge holder and the hand of the operator compromising proper cartridge operation. Common manual dexterity issues can reduce grip strength and compromise proper cartridge operation.

Cartridges and cartridge holders are often manufactured from metal for strength and durability. The rapid expansion of gas when the cartridge is pierced can create extremely cold temperatures which can be conducted through the metal to the operator's hand causing potential discomfort or injury. Cartridge holders manufactured partially or completely from plastic are available that reduce thermal transfer but durability is reduced.

Thus there remains a need for a mechanism to reliably attach to a device using cartridges, that can permit rapid insertion and removal of the cartridge without straining a user.

There remains a need for a way to reliably ensure cartridges dispense their content without creating uncomfortable or hazardous conditions for users.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
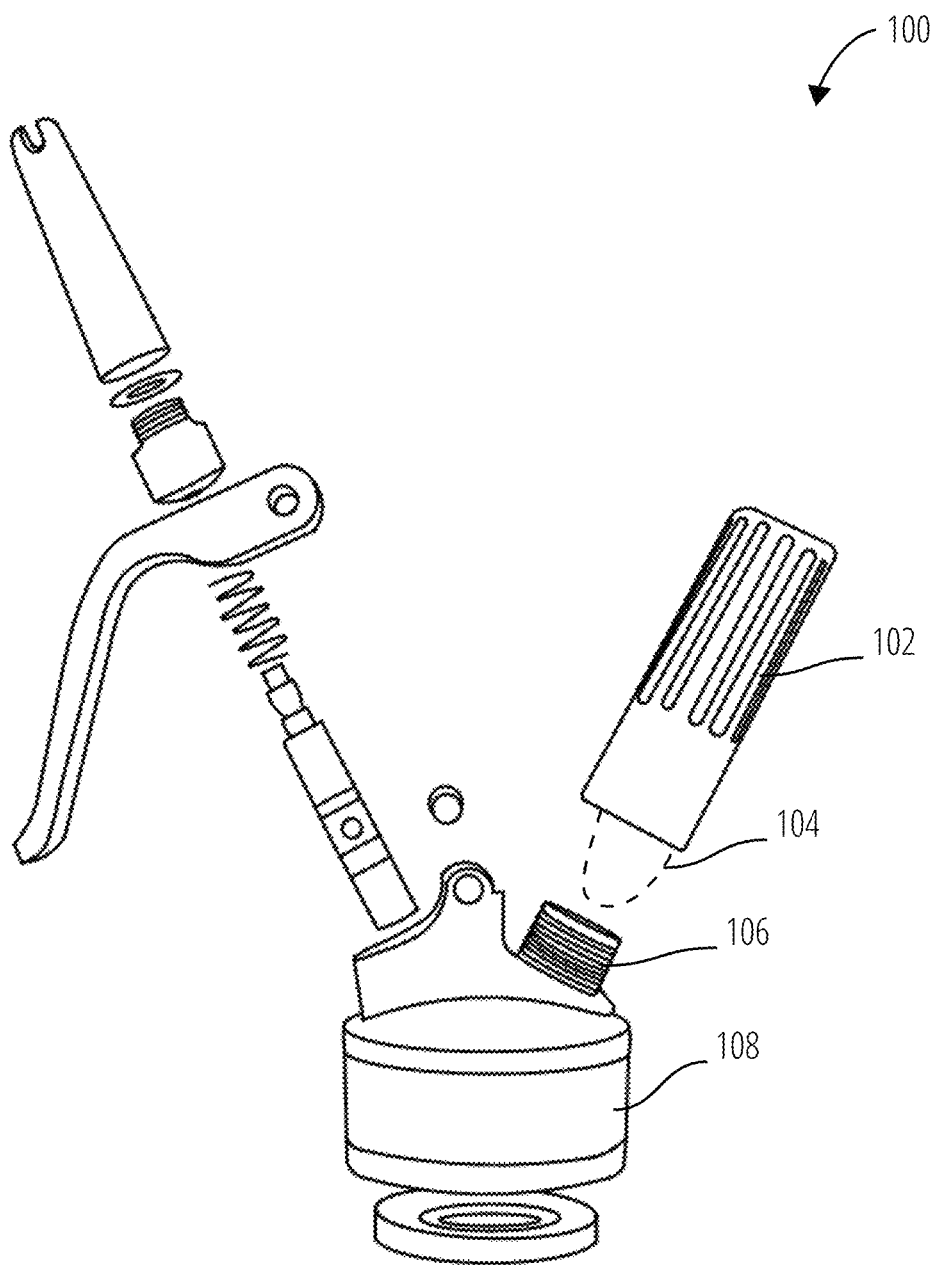
FIG. 1 illustrates a dispensing device 100 in accordance with one embodiment.

This disclosure is directed generally to an apparatus for holding a cartridge containing a compressed material, such as a gas like $N_2O$, $CO_2$, or other compounds or elements as are frequently used in tools, appliances or devices that need compressed gas or liquid to operate. The apparatus includes a lever arm comprising a hinge axis and a cam centered on the hinge axis. The apparatus also has a cartridge loader housing for receiving the cartridge. The cartridge loader housing has a housing connector end and a housing base end, the housing connector end adapted to connect to an appliance, and the housing base end adapted to allow the lever arm to open and close. The cartridge loader housing has an aperture exposing an interior of the cartridge loader housing, and the aperture is shaped to receive the cartridge and the lever arm. The cam is adapted to assist in seating the cartridge in the cartridge loader housing when the lever arm is closed, and ejecting the cartridge when the lever arm is opened.

The lever arm may have an over center region defined by the cam and the lever arm. The lever arm may have a cam for ejecting the cartridge when the lever arm is in an open position. The cam moves the cartridge from being aligned with the cartridge loader housing to being out of alignment with respect to the cartridge loader housing. The lever arm may be actuated to a position over 180 degrees between an open position and a closed position. The housing base end may have a locking tab capable of engaging the lever arm and securing the lever arm in a fixed position. The fixed position of the lever arm may be the closed position. The cartridge loader housing may have a pair of recess, apertures, notches or pins for receiving the hinge axis.

The housing connector end of the apparatus connects to an appliance. The connection may be a mechanical, magnetic or chemical type of engagement. The appliance may be a device used in the preparation of food or food products.

There are also described herein a method of loading a gas cartridge holding apparatus onto an appliance. The method involves attaching an apparatus for holding the cartridge to the appliance, opening a lever arm to reveal an aperture for receiving the cartridge, inserting the cartridge through the aperture until the cartridge is substantially seated in the apparatus, and closing the lever arm until the lever arm locks in a closed position.

There is also a method for using an apparatus for holding a gas cartridge, the apparatus attached to an appliance. The method involves opening a lever arm, the lever arm having a cam for mechanically engaging the cartridge. The movement of the cam against the cartridge causes the cartridge to eject from a seated position in the apparatus. A user can engage in removing the cartridge from the apparatus, inserting a new cartridge into the apparatus, and closing the lever arm such that the cam engages the cartridge and causes the cartridge to be seated in the apparatus.

Disclosed herein are embodiments of a dispensing device that is simple to install and easy to operate will now be described in greater detail. The dispensing device has two components: a cartridge loader housing and a lever arm. Throughout the description, reference is made to a cartridge. The cartridge may be a container with compressed gas or liquid in it. Commercial cartridges for use in culinary appliances frequently use $N_2O$ and $CO_2$. Other gases and liquids are also contemplated in this disclosure. Reference herein to a cartridge, or gas cartridge is meant as a generic reference to any cartridge containing a compressed gas or compressed liquid (or combination of gas and liquid) for use with an appliance (which is not restricted to a culinary appliance).

The cartridge loader housing of the dispensing device comprises a housing connector end to connect to an appliance. The housing connector end may be adapted to engage the cartridge fitting on the appliance. This fitting may be a threaded connector of a screw-on type. The housing connector end may comprise either a male or female threaded connector, depending on the appliance to connect to. In addition to a screw-on type of connection, the connector may be any other type that may secure the dispensing device to the appliance. By way of examples, but not intended to be limiting, the connector may be bayonet, snap on, compression, interference fit, or any other type of mechanical, magnetic or chemical connection.

The cartridge loader housing interior if formed to facilitate aligning the cartridge properly with a cartridge puncture mechanism. The housing interior may have rib formations aligned generally parallel with a long axis of the cartridge. These rib formations may be contoured to help direct a cartridge tapered area toward the cartridge puncture mechanism of the appliance. The rib formation may be tapered near the housing connector end so that the cartridge is guided to a consistent position within the cartridge loader housing. There may be multiple rib formations, or a molded solid surface, or other contours that help guide the cartridge. The contacting surfaces of the housing interior may be made from plastic, metal, cloth, wood or other materials that allow the cartridge to slide along the housing interior without catching on the rib formation. In general the housing interior may act like a funnel so that the cartridge is always directed to the same path and position every time a new cartridge is loaded into the device. A user may place a cartridge into housing main aperture, and push the cartridge into place so the dispensing device may properly align the cartridge when the lever arm is actuated.

The cartridge loader housing comprises a housing base end corresponding to the base of the cartridge. The housing base end is open on the front and back, and housing sidewalls act as retaining walls for the lever arm. The housing base end has a pair of recesses, apertures, indents, pins or other features to act as, or receive, a hinge axle. In some embodiments the hinge axle may have a partial flange about the axle circumference to match a key-way in the aperture of the cartridge loader housing. This provides a locking mechanism so the hinge axle may be inserted into the cartridge loader housing in one orientation, and not become misaligned or pop out during operation. The hinge axle may be a male fitting part, or a female fitting part.

The lever arm is designed for easy and comfortable handling by a user. The lever arm may be grasped or handled by a user to actuate a camshaft centered on the hinge axle. The lever arm provides a user with mechanical advantage while a cam engages and moves the cartridge into and out of position. When the lever arm is open, it reveals the housing main aperture where a cartridge can be loaded. The housing main aperture is shaped to allow the cartridge to be inserted only one way (cartridge nozzle toward the housing connector end, or toward the appliance). If he cartridge is reversed, it won't fit through the housing main aperture and it won't load. When the cartridge is inserted through the housing main aperture defined by the cartridge loader housing and the camshaft, the lever arm may be actuated toward the closed position. The shape of the cam provides mechanical advantage and causes the cartridge to be pushed into the proper position in the cartridge loader housing. The cam produces increasing pressure on the cartridge as the lever arm approaches the closed position, until the cartridge is urged against a cartridge puncture mechanism on the appliance. The cartridge is urged axially toward the housing connector end, and guided into position so that the cartridge nozzle is punctured, releasing the compressed material into the appliance. The lever arm may be held in place by a snap fit connection with the cartridge loader housing. The closed lever arm position locks the cartridge into position (axial with the cartridge puncture mechanism, and aligned in the cartridge loader housing). The locked position aligns the cartridge nozzle flush against the receiver of the appliance, so the cartridge nozzle is properly punctured and the compressed gas or liquid is vented into the appliance. The cam and lever arm form a recess that generally matches the curvature of the cartridge. This recess is referred to herein as the lever arm open center region. When a user places a new cartridge into the dispensing device, the curved cartridge base (opposite the cartridge nozzle) may touch the lever arm open center region. When the lever arm is closed, the lever arm open center region engages the cartridge base by increasing the contact area between the lever arm open center region and the cartridge base. The lever arm open center region moves the cartridge forward into the cartridge loader housing, and at the same time seats the cartridge into the cartridge loader housing. The lever arm open center region may have a liner of compressible material (e.g., rubber), to accommodate small deviations in cartridge curvature, length or width. The compressible material may be integrated into the cam and lever arm material, or it may be added as an overlayer after the lever arm is manufactured. If the lever arm is printed, it is possible to print the lever arm open center region with more than one material.

When the cartridge is replaced, the lever arm is opened, and the camshaft urges the cartridge base out of the cartridge loader housing. The lever arm open center region operates in reverse to lift the cartridge out of the cartridge loader housing, and draw the cartridge back (toward the housing base end) so the cartridge nozzle of the cartridge does not get trapped in the housing funnel area. When the lever arm is opened beyond a certain angle, a cam on the lever arm engagement end engages the base of the cartridge, urging the cartridge out of the cartridge loader housing for easy grasping and removal by a user. The housing main aperture has a housing interior narrowed region near the housing base end that acts as an interference gap space. This prevents the cartridge from being ejected from the cartridge loader housing in an uncontrolled manner. The cam pushes the cartridge through this housing interior narrowed region so a user can easily grasp the spent cartridge and remove it. A new cartridge can be inserted into the cartridge loader housing, and the lever arm closed to slide the new cartridge into place so the compressed gas or liquid is properly vented, and the cartridge is loaded using improved mechanical advantage.

The housing base end may have a locking tab that prevents the lever arm from moving when the lever arm is in fully closed position. The locking tab is moveable, allowing the lever arm to be actuated. The housing interior narrowed region may be formed from a pair of flanges which prevent the "ejection" of the cartridge, thus the cartridge can be pushed out of the cartridge loader housing, but the interference with the flanges prevents the cartridge from "flying" out of the cartridge loader housing in an uncontrolled manner. The closing of the lever arm has the effect of pushing the bulk of the cartridge down through the flanges when the cartridge is being loaded.

The housing connector end may comprise a pair of holes. These holes may be used to assist in removing a threaded core of the cartridge loader housing during injection molding. They can also be used to insert set screws on either side to secure the cartridge loader housing in place on the appliance.

FIG. 1 provides an illustration of a prior art whipped cream dispensing device 100. The dispensing device 100 comprises a dispensing device 108 that mixes compressed gas from a cartridge 104 with cream to produce whipped cream. A cap mount 106 of the dispensing device 108 receives a cartridge cap 102 enclosing a cartridge 104. A user places the cartridge 104 within the cartridge cap 102, then secures the cartridge cap 102 to the cap mount 106. By screwing the cartridge cap 102 on to the cap mount 106, the cartridge 104 is urged into a cartridge puncture mechanism that punctures the cartridge nozzle, releasing the compressed material into the dispensing device 108. The threads on the cap mount 106 and the cartridge cap 102 match, and are frequently high pitch, allowing for more axial advancement per turn of the cartridge cap 102. The larger axial advancement provides faster connection with the cartridge nozzle tip and a sealing mechanism in the cap mount 106. By decreasing the time between the puncture of the cartridge nozzle and the contact of the cartridge 104 with the sealing mechanism, less gas may potentially escape from the cartridge 104. The uniform threads on the cartridge cap 102 and cap mount 106 do not provide any mechanical advantage to the user screwing on the cartridge cap 102. Furthermore, when the cartridge 104 makes contact with the cartridge puncture mechanism, the resistance can increase, causing the rate of movement axially to decrease.

When the compressed gas is exhausted, the cartridge 104 must be replaced. This is done by unscrewing the cartridge cap 102 and pulling the cartridge 104 off the cartridge puncture mechanism and sealing mechanism using the torque force of unscrewing the cartridge cap 102. When the cartridge cap 102 is removed, the user retrieves the spent cartridge 104 from inside the cartridge cap 102, and replaces it with a new cartridge, and repeats the loading process.

Figure 2:
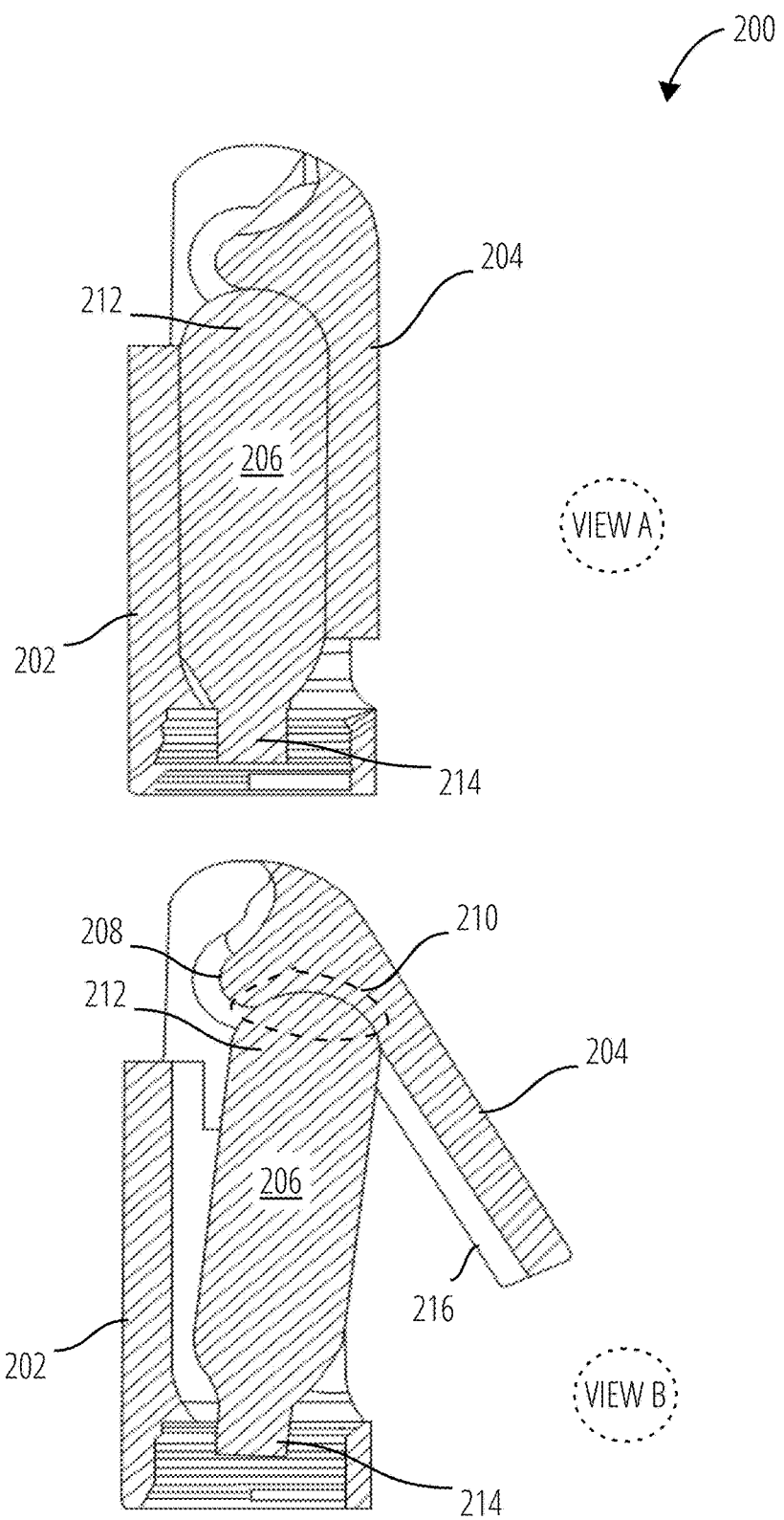
FIG. 2 illustrates a dispensing device 100 in accordance with one embodiment.

An embodiment of a cartridge loader 200 that provides mechanical advantage to a user, with decreased loading and unloading time and reduced manual stress is now shown in FIG. 2. The cartridge loader 200 comprises a cartridge loader housing 202 and a lever arm 204. A cartridge 206 comprising a cartridge nozzle 214 is illustrated within the cartridge loader 200, however the cartridge 206 itself is not part of the cartridge loader 200.

In View A of FIG. 2, the cartridge loader 200 is in a closed position. In View B of FIG. 2, the lever arm 204 is partially actuated. The cartridge base 212 is flush with the lever arm open center region 210 of the lever arm 204. The lever arm open center region 210 may be generally formed at the juncture of the cam 208 and the lever arm 204. A lever arm interior side 216 may be recessed and curved to better accommodate the surface profile of cartridge 206. The lever arm 204 rotates on a hinge axle (see FIG. 4, View A) coupled to the cartridge loader housing 202. The region of the lever arm 204 distal from the cam 208 may be referred to herein as a handle of the lever arm 204.

Figure 3:
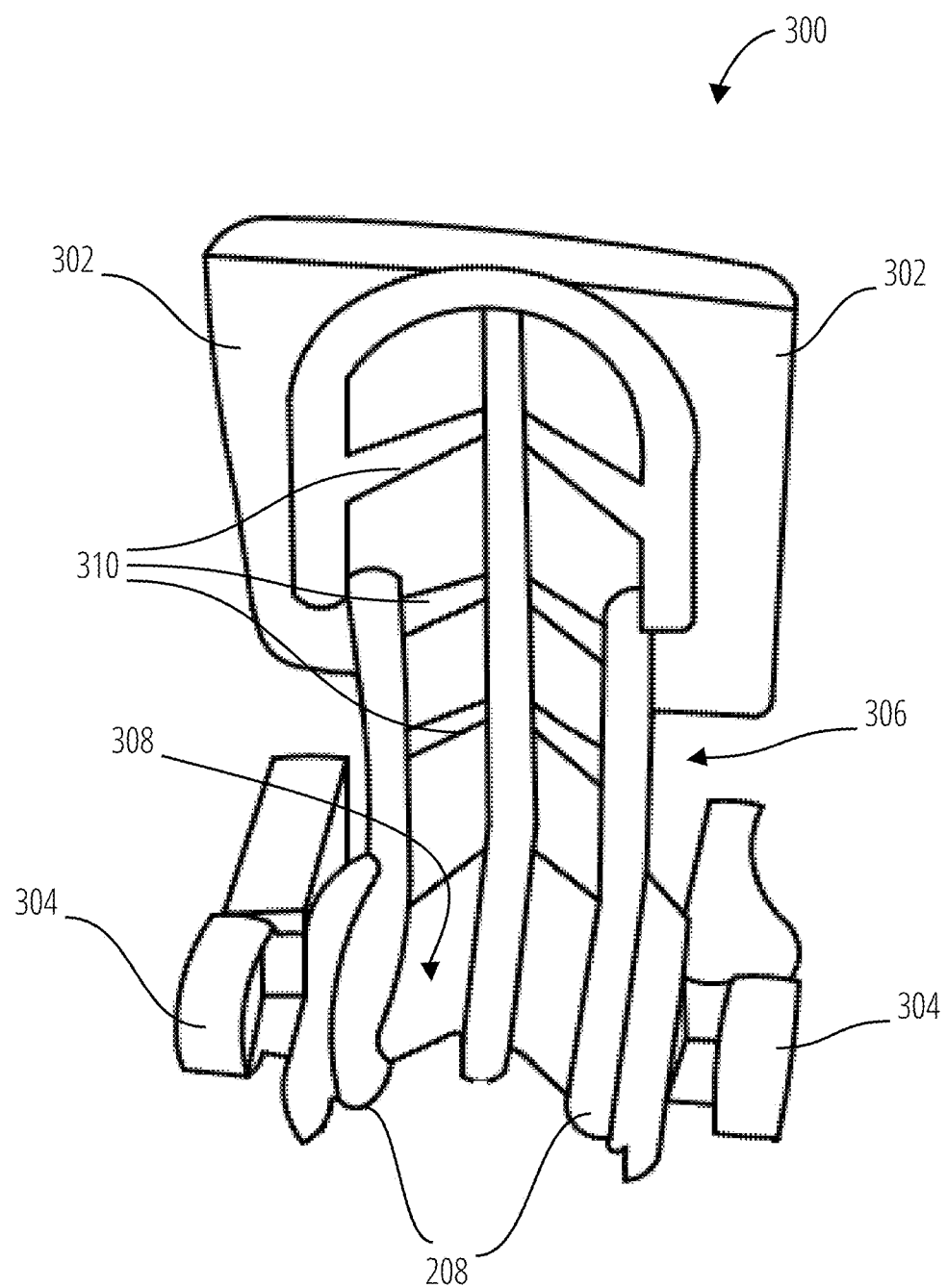
FIG. 3 illustrates a dispensing device 100 in accordance with one embodiment.

An embodiment of a lever arm 300 is illustrated in FIG. 3. The lever arm 300 may have a unibody design with a wide tab region 302 for ease of handling. A housing interior narrowed region 306 extends from the wide tab region 302 to the hinge axle 304. The housing interior narrowed region 306 and the cam 208 may form a lever arm open center region 308 on the interior side of the lever arm 300. In some embodiments, there may be a rib formation 310 or other contoured features of the interior side (shown facing) of the lever arm 300. The rib formation 310 may generally match the surface profile of a cartridge when the cartridge is loaded into the cartridge loader 200. The lever arm open center region 308 and the rib formation 310 may be made of a material with a low coefficient of friction, so as to facilitate the sliding of the cartridge against these surfaces.

The lever arm 300 may rotate on a hinge axle 304 in various embodiments. Alternatively the lever arm 300 may have a receptacle to receive pins in the cartridge loader housing 202, and rotate on the pins. The hinge axle 304 may be a male part or female receptacle(s). In another embodiment, there may be an aperture through which a hinge axle 304 may be threaded. In still another embodiment, there may be a snap-on fitting for the lever arm 300 to engage a hinge axle already positioned across the interior of the cartridge loader housing 202. In yet another embodiment, there may be a pair of extension flanges that may snap on, or fit to the exterior of the cartridge loader housing 202, and fit into either male or female fittings that serve as the hinge axle.

The hinge axle 304 may have partially extending tabs or flanges that may fit into matching shaped key-way in the cartridge loader housing. In such an embodiment, the extending tabs or flanges may help to secure the lever arm 300 in position during operation, but allow the lever arm 300 to detach or attach to the cartridge loader housing 202 when the tabs/flanges are properly aligned with the key-way.

The cam 208 may engage the cartridge loader housing 202 in a manner that allows the cam 208 to rotate, actuating discharge of the cartridge 206. In some embodiments, the cartridge loader housing 202 and lever arm 300 assembly forms the cartridge loader 200. In an embodiment, the cam 208 may convert rotation of the cam 208 into linear motion of the cartridge 206, driving the cartridge 206 toward a cartridge puncture mechanism. Moving the lever arm 300 in the opposite direction may cause the release of the cartridge 206 from the cartridge puncture mechanism. A knob or other attachment may be provided on the lever arm 300 to increase mechanical advantage and reduce the required manual dexterity for actuation of the cam 208. While a lever arm is shown in the various embodiments herein, the lever arm may be replaced or enhanced with some other component for a user to actuate (such as a knob, a ring, a lanyard and so on).

Figure 11:
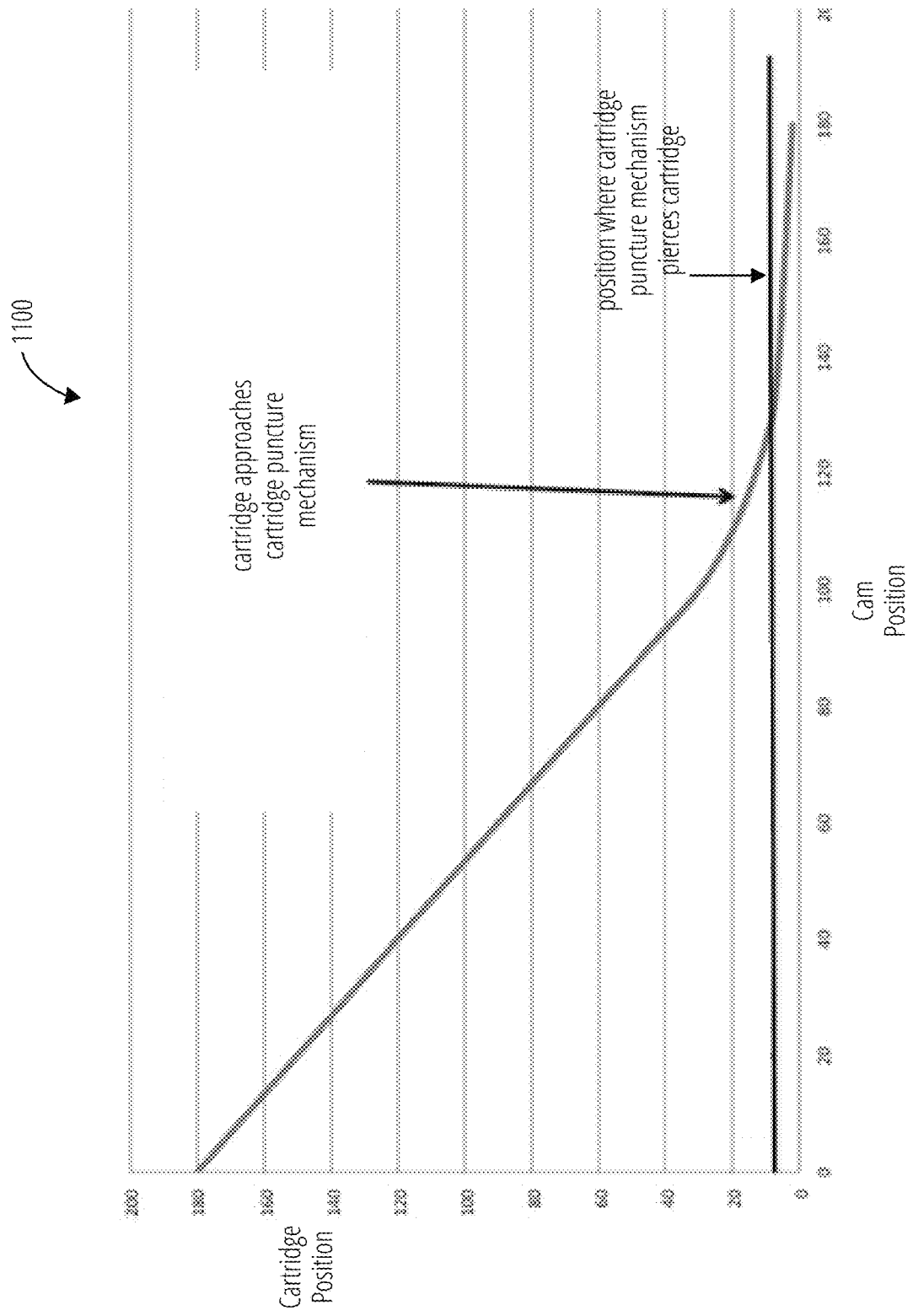
FIG. 11 illustrates an actuation profile 1100 in accordance with one embodiment.

In addition, the cam 208 may facilitate smooth translation between open and closed (discharge) positions of the cartridge loader 200. A cam 208 with a variable profile may provide increased actuation speed when required force is low (cartridge 206 approaching the cartridge puncture mechanism) and increased mechanical advantage when the required force is high (piercing the cartridge 206 with the cartridge puncture mechanism). As shown in the actuation profile 1100 of FIG. 11, when the cam 208 is near the open position, the displacement of the cartridge 206 is fast with respect to the cam 208 movement, rapidly reducing clearance between the cartridge 206 and the cartridge puncture mechanism. As the cartridge 206 approaches the point where the cartridge puncture mechanism will pierce the cartridge 206, the cam 208 shape varies to make displacement of the cartridge 206 small with respect to the cartridge 206 position, providing increased mechanical advantage and decreased force applied by the operator to the lever arm 204 when puncturing the cartridge 206. In still other embodiments, the cam 208 profile can be used to prevent high forces from being applied to parts of the cartridge loader 200 that may adversely affect durability.

Some embodiments may utilize a reciprocating cam movement where the action of the cam 208 to complete a cycle involves rotation of the cam 208 in one direction to a stop point, followed by counter-rotation of the cam 208 in the reverse direction to complete and restart the cycle. A continuous cam 208 motion is also possible where the cam 208 rotates in the same direction continuously to complete a cycle.

Figure 12:
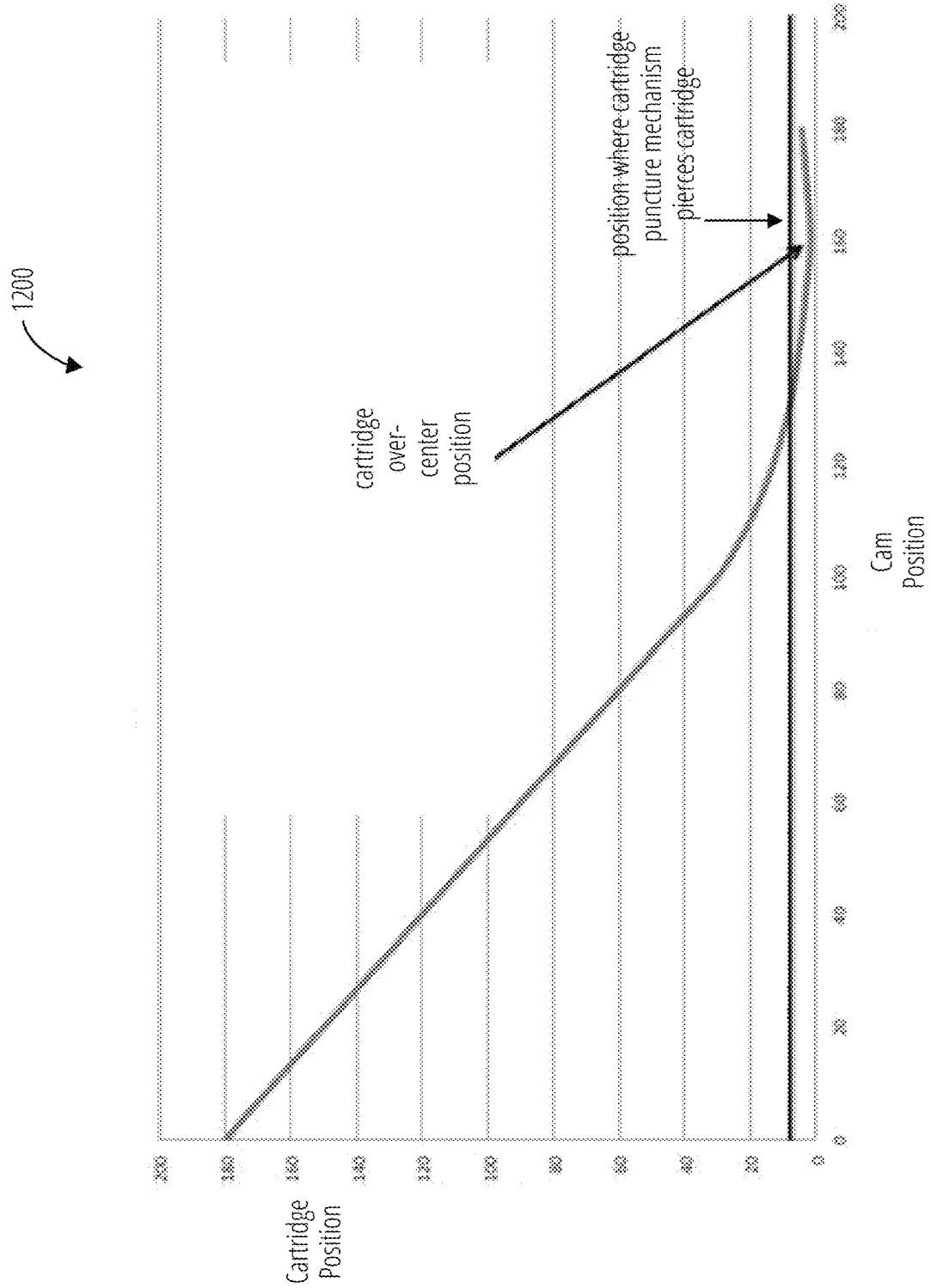
FIG. 12 illustrates an actuation profile 1200 in accordance with one embodiment.

In some embodiments the cam 208 profile may provide an "over center" action where the cartridge 206 is driven beyond the displacement required for the cartridge puncture mechanism to pierce the cartridge 206 when moving between open and discharge positions or between eject and discharge positions. The over center action occurs while the cartridge 206 is engaged to the lever arm open center region 210 defined by the cam 208 and the lever arm 204. See the actuation profile 1200 of FIG. 12. When the lever arm 300 is not in the fully opened position it may act to restrict the egress from the housing interior so that the cartridge 206 cannot pop out.

Figure 4:
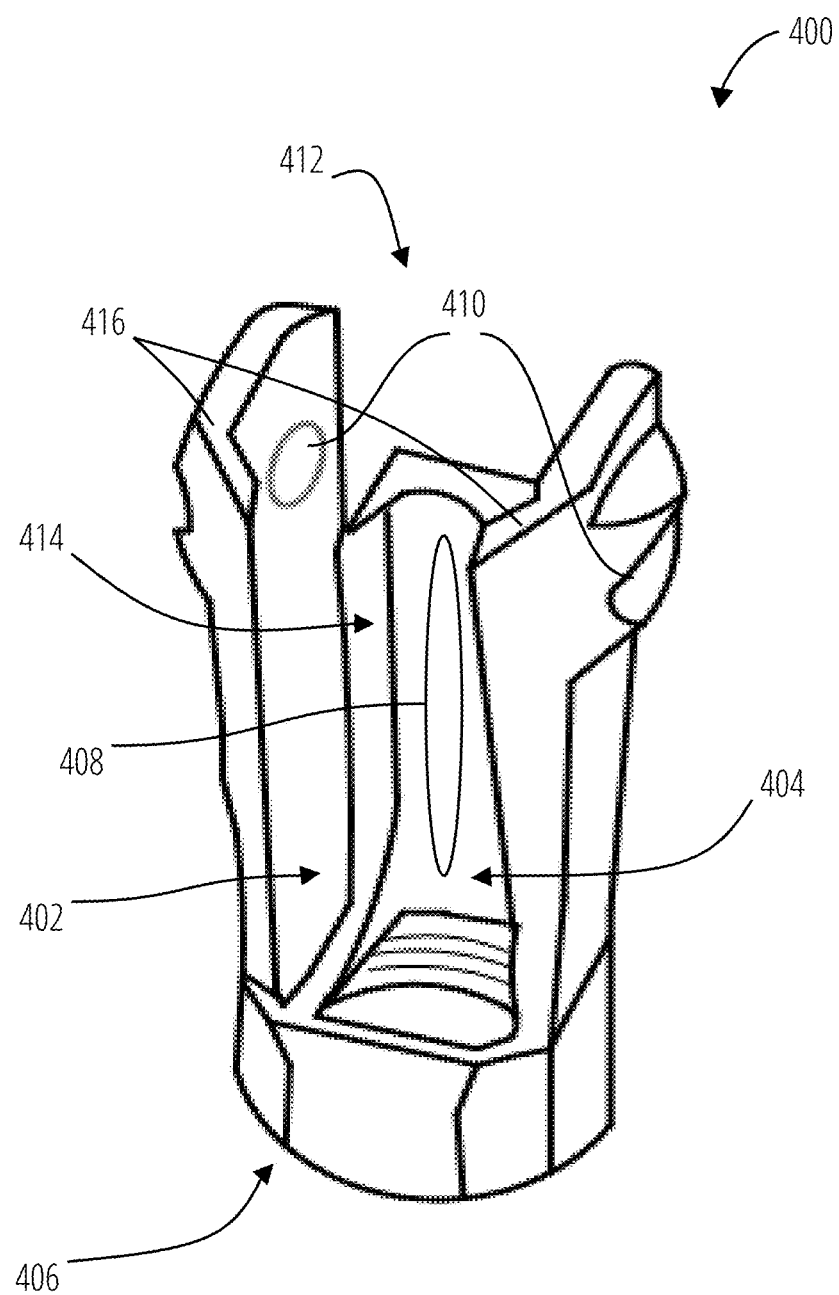
FIG. 4 illustrates a dispensing device 100 in accordance with one embodiment.

FIG. 4 illustrates an embodiment of a cartridge loader cartridge loader housing 400. The cartridge loader housing 400 may be a unibody design according to some embodiments. The cartridge loader housing 400 may have a housing main aperture 402 designed to admit the cartridge 206, as well as one or more smaller apertures arranged around the cartridge loader housing. The housing main aperture 402 may open to the housing interior 404 from a housing connector end 406, which may be adapted to fit into a variety of appliances that use cartridges. The housing connector end 406 may be threaded on the interior or exterior. The housing interior 404 may have one or more rib formation 408 or other contours. These contours may match the profile of a cartridge when seated within the housing interior 404. These contours may also help seat the cartridge into the cartridge loader housing 400 when the lever arm is actuated. As in the lever arm, the contours or rib formation 408 may be made of a material with a low coefficient of friction, so that the cartridge slides easily against these surfaces when the cartridge is in motion.

The cartridge loader housing 400 may have aligned housing apertures 410 that are aligned normal to a long axis of the cartridge loader housing 400. The aligned housing apertures 410 may be positioned near a housing base end 412 and be adapted to receive the hinge axle 304 of the lever arm 300. The aligned housing apertures 410 may have key-way for fitting in similarly shaped tabs or flanges of the hinge axle 304, such that there is a single position where the lever arm 300 is accepted for coupling to the cartridge loader housing 400. In all other positions the lever arm 300 is "locked" into a rotational position with respect to the cartridge loader housing 400 and cannot easily be pulled, torqued or otherwise moved out of position.

The housing main aperture 402 may have a housing interior narrowed region 414 where a pair of flanges or lateral extensions of the cartridge loader housing 400 narrow the width of the housing interior 404. This housing interior narrowed region 414 may be more toward the housing base end 412. The housing interior narrowed region 414 may be slightly narrower than the width of a cartridge 206. This provides some mechanical engagement with the housing interior 404 and the cartridge 206 on insertion and ejection. The lever arm 204 then does the mechanical work to press the cartridge 206 through the housing interior narrowed region 414 when the lever arm 204 is urged into a closed position. The cam 208 on the lever arm 204 does the mechanical work to push the cartridge 206 through the housing interior narrowed region 414 when the lever arm 204 is opened, and the cartridge 206 is ejected. The housing interior narrowed region 414 may prevent an ejected cartridge 206 from coming lose and falling out of the cartridge loader 200. A user may then grasp the spent cartridge 206 and remove it.

Figure 5:
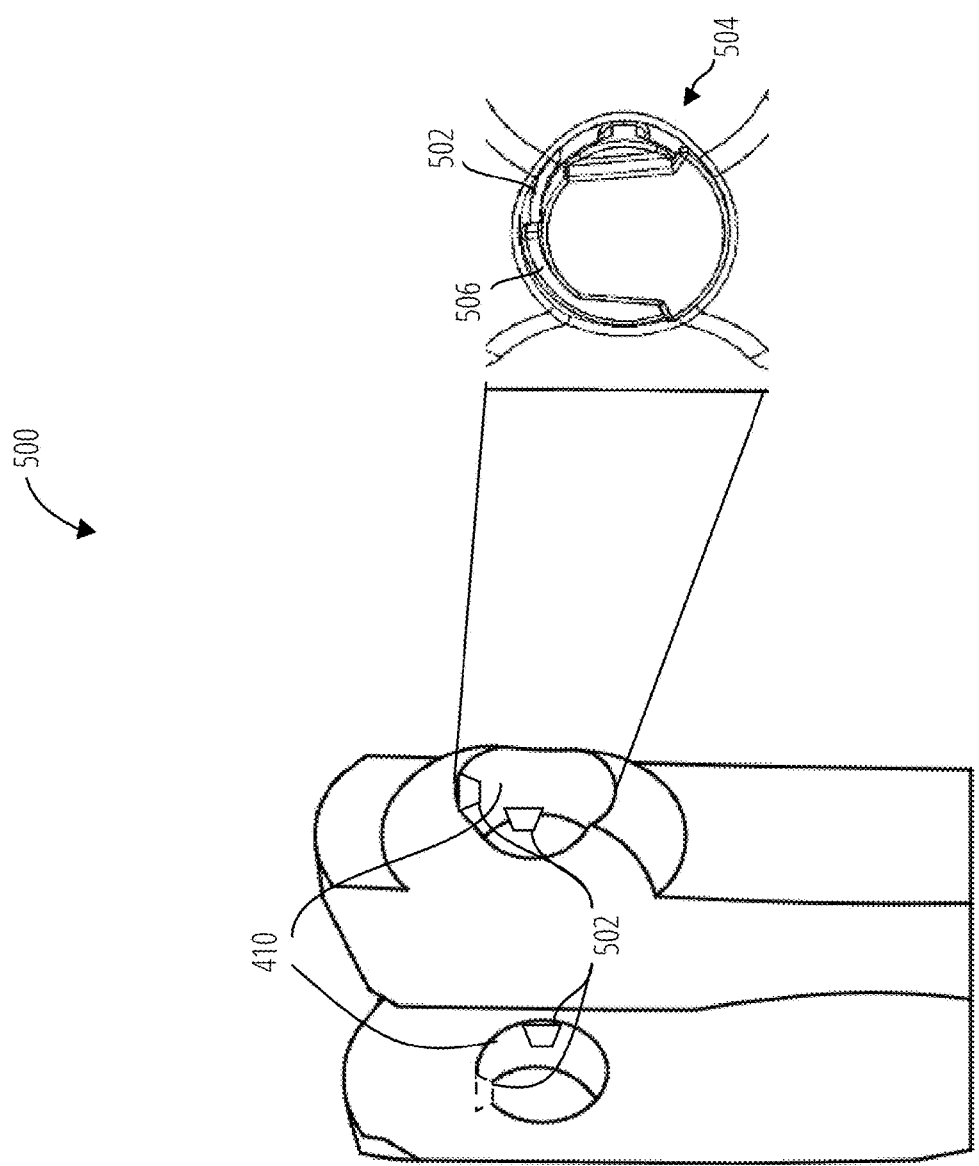
FIG. 5 illustrates a dispensing device 100 in accordance with one embodiment.

FIG. 5 illustrates an enlarged view of the housing base end 500 in one embodiment. The aligned housing apertures 410 are formed normal to a long axis of the cartridge loader housing 400. The aligned housing apertures 410 may comprise key-ways 502 for receiving a tab or flange on the hinge axle 304. The tab or flange of the hinge axle 304 may act as a key and fit with the aligned housing apertures 410 to position the hinge axle 304 with respect to the cartridge loader housing 400. There may be a locking tab (not shown) on the housing base end 500 that can retain the lever arm 204 in a fixed position. The locking tab may be actuated to allow the lever arm 204 to move from the closed position to the open position.

In some embodiments the lever arm 204 may alternatively comprise apertures to receive a bar across the inside of the cartridge loader housing 400, the bar operating in the same fashion as the hinge axle 304.

Figure 6:
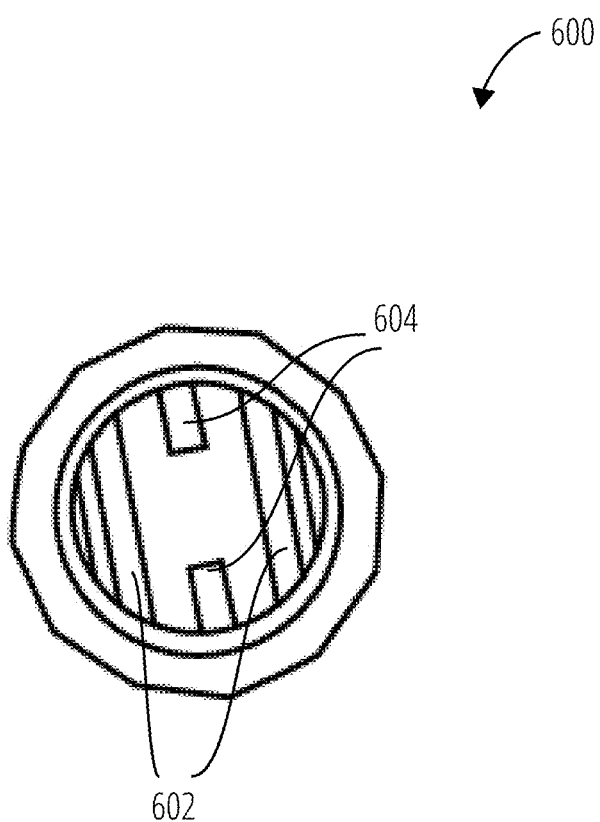
FIG. 6 illustrates a housing connector end 600 in accordance with one embodiment.

FIG. 6 illustrates a view down the long axis of the cartridge loader housing 400 through the housing connector end 600, in one embodiment. The housing connector end 600 may have one or more stop barriers 602 to halt the forward advancement of a cartridge 206 beyond the limits of the cartridge loader housing 400. Alignment barriers 604 may be used to allow the cartridge nozzle 214 to protrude from the cartridge loader housing 400 and engage the cartridge puncture mechanism of an appliance. The alignment barriers 604 may also enable the cartridge nozzle 214 to abut a sealing mechanism of the appliance (so that gas or other material does not leak out around the cartridge nozzle 214 once punctured).

Figure 7:
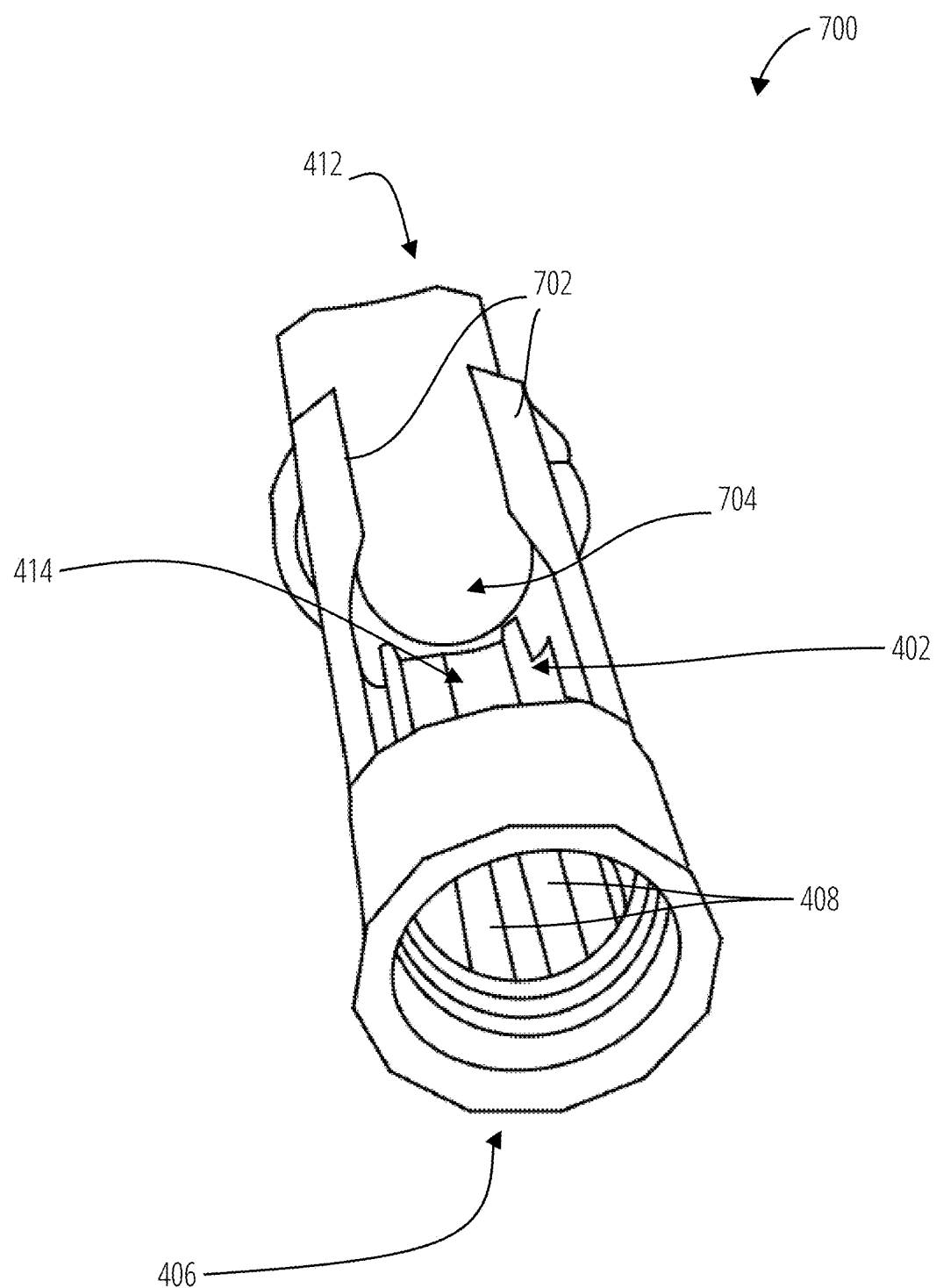
FIG. 7 illustrates a dispensing device 100 in accordance with one embodiment.

FIG. 7 illustrates a cartridge loader housing 700 in one embodiment. The cartridge loader housing 700 comprises a housing connector end 406 with a housing interior threaded section (threaded area of housing connector end 406). The housing interior threaded section may engage with the dispensing device 108 of an appliance (as shown in FIG. 1). The housing base end 412 couples to the lever arm 204 and has housing base end aperture 704 for receiving a cartridge and for retaining the lever arm 204 in the closed position. The housing base end aperture 704 may comprise a housing interior narrowed region 414 with extending flanges 702 that engage the cartridge 206 as it is inserted or removed from the cartridge loader housing 700.

Figure 8:
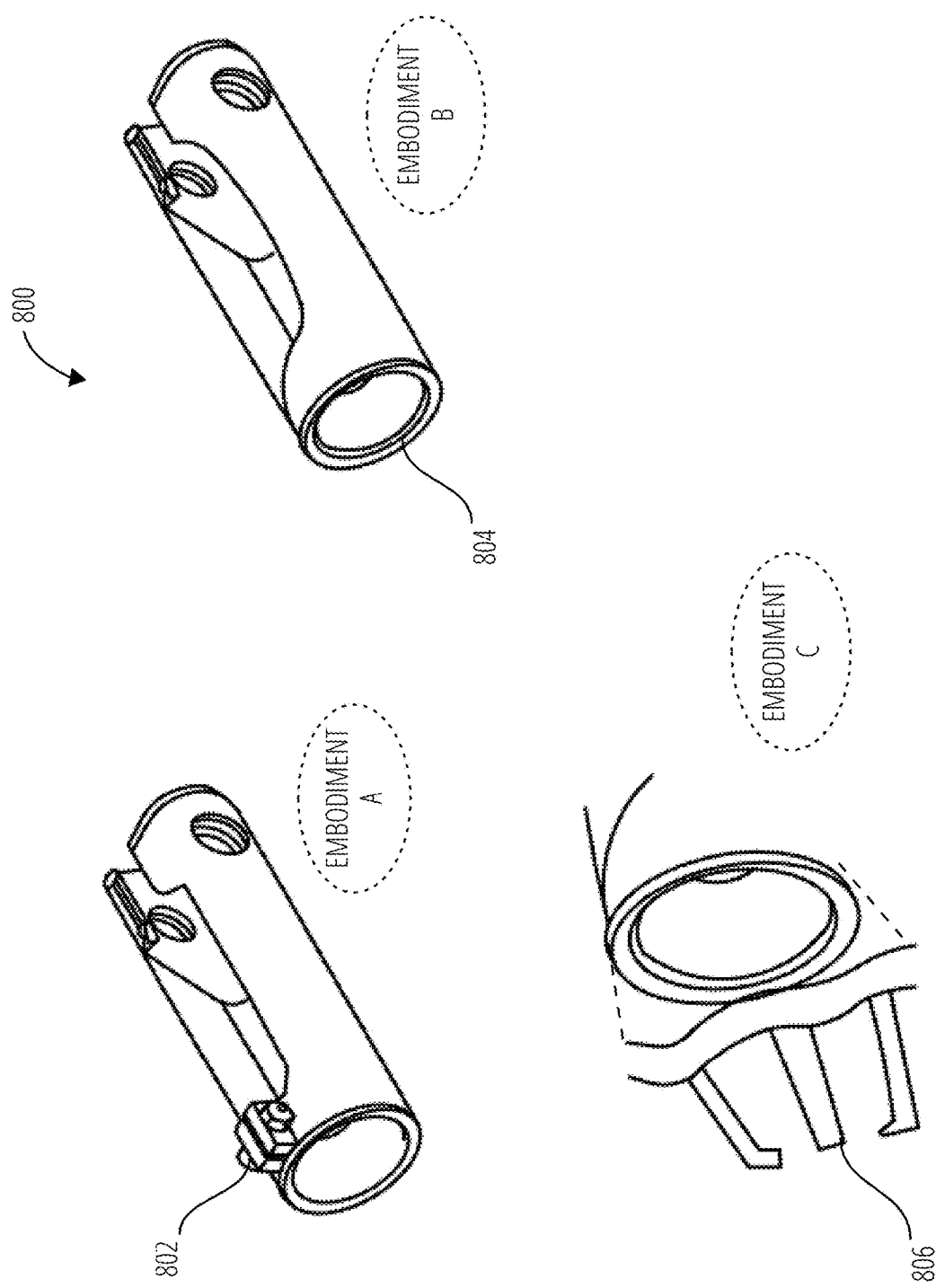
FIG. 8 illustrates a housing connector end embodiments 800 in accordance with one embodiment.

FIG. 8 illustrates housing connector end embodiments 800 for coupling the cartridge loader housing to an appliance. By way of illustration and in non-limiting examples, a screw fastener 802 may be used to tighten the housing connector end to the appliance (Embodiment A). Alternatively, the housing connector end may comprise a snap connector 804 (Embodiment B). In another embodiment, a claw grip 806 connector may be utilized. Magnetic or a combination of magnetic and mechanical connectors may also be utilized.

Figure 9:
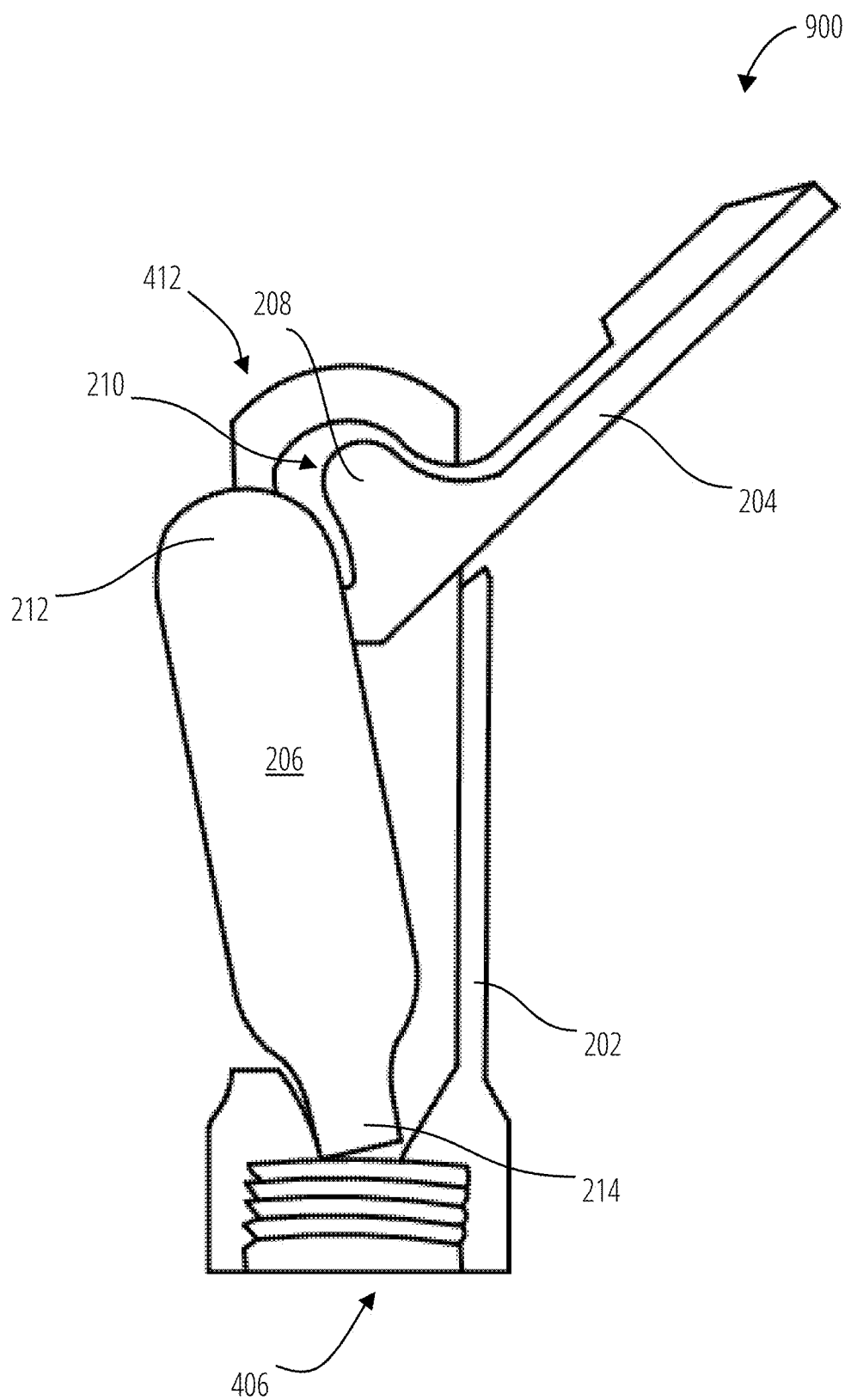
FIG. 9 illustrates a dispensing device 100 in accordance with one embodiment.

FIG. 9 illustrates cartridge ejection 900 in one embodiment. Once the cartridge 206 is spent, the cartridge 206 may be ejected using cam 208 at the housing base end 412 of the lever arm 204. The cam 208 may be positioned so when the lever arm 204 is fully open, the cam 208 urges the cartridge 206 out of the cartridge loader housing 202 such that the cartridge 206 may be easily grasped by a user. The lever arm open center region 210 may facilitate removal of the cartridge 206, while the cam 208 continues the ejection movement and urges the cartridge 206 further past the housing interior narrowed region 414. Various angles of opening and closing the lever arm 204 work to assist in seating and ejecting the cartridge 206. The cartridge loader housing 202 may be designed so the housing base end aperture 704 enabling the cartridge 206 to be inserted, may restrict the lever arm 204 to a movement of about 90 degrees. The lever arm 204 may be designed so that the lever arm 204, the cam 208, and the lever arm open center region 210 operate within a 90 degree range of motion. Greater mechanical advantage (and increased ease of use) may be gained by increasing the lever arm 204 operating angles to over 180 degrees. Various designs of the cam 208, lever arm 204 and lever arm open center region 210 may combine to provide optimal resistance and mechanical work forces that maximize the comfort of the user. Some designs may provide too much assistance to the user, so there may not be enough tactile feedback to the user. In some embodiments, a user may desire more resistance to provide greater tactile feedback.

In some embodiments each of the cartridge loader housing and lever arm may be a unibody construction. In some embodiments the cartridge loader housing and lever arm may be assembled from two or more pieces. The cartridge loader housing and lever arm may be injection molded parts, they may be 3D printed, assembled, machined, cut or cast. The parts may be made from various polymer materials such as ABS plastic, polyethylene, polycarbonate, polypropylene or any other suitable polymer. The cartridge loader housing and lever arm may alternatively be made from metal or metal alloys. The cartridge loader housing and lever arm may be crafted from organic materials such as wood, or carved from inorganic materials like granite. The lever arm and cartridge loader housing may be made from different materials in any combination.

Figure 10:
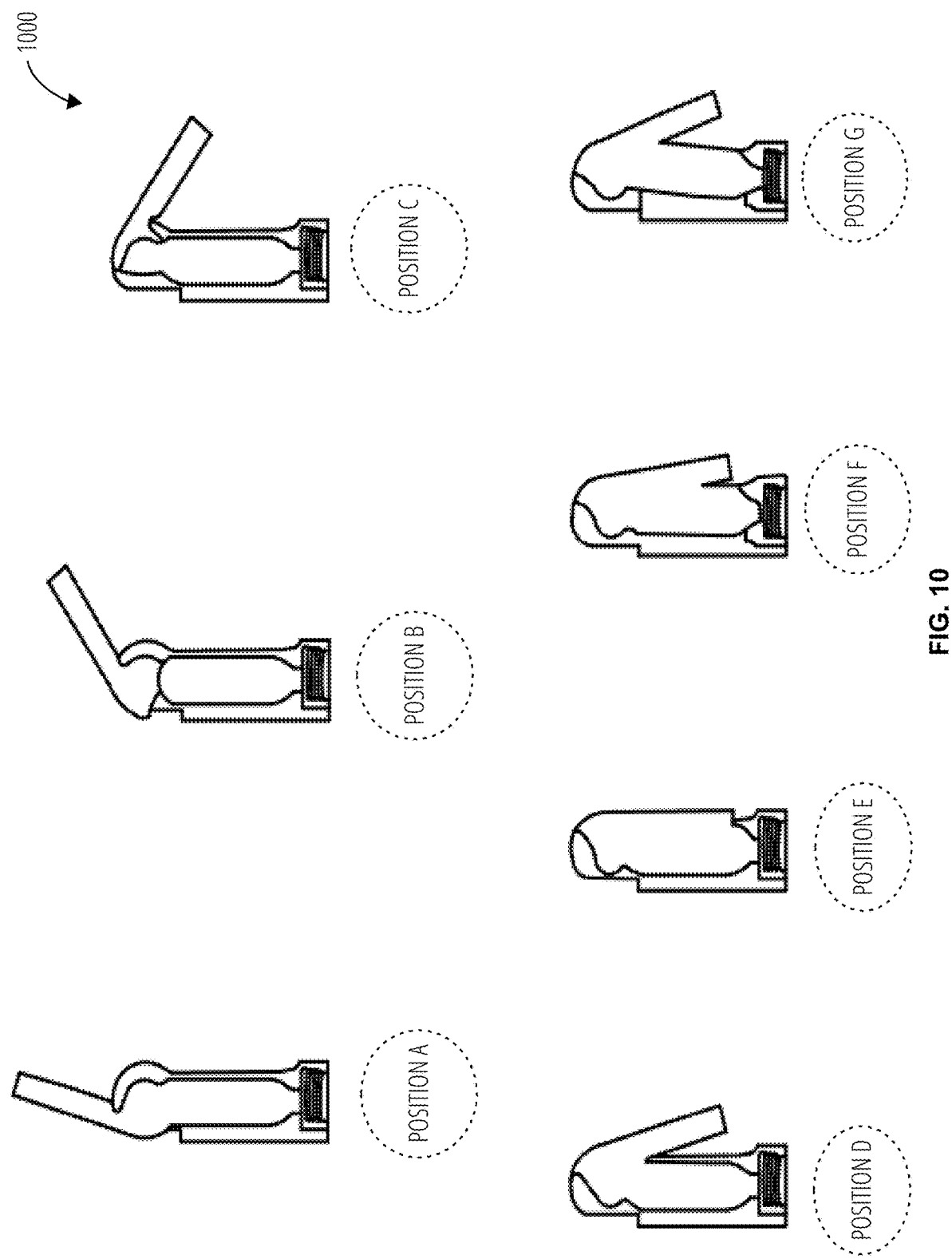
FIG. 10 illustrates a dispensing device 100 in accordance with one embodiment.

Methods of operating a cartridge loader are now described in conjunction with the cartridge loader operational positions 1000 of FIG. 10. A user may load a cartridge into the cartridge loader by placing the cartridge nozzle of the cartridge into the loader with the cartridge nozzle facing the housing connector end of the cartridge loader. Here the lever arm is in the open position (FIG. 10, position A).

A user may then actuate the lever arm, causing the cam to engage the cartridge and drive the cartridge toward the dispensing device of an appliance (FIG. 10, position B).

The cartridge movement slows as the cartridge nozzle approaches a cartridge puncture mechanism (FIG. 10, position C).

The cartridge base becomes engaged with the over center region (FIG. 10, position D).

When the lever arm is fully closed, the cartridge is advanced the most and the contents of the cartridge may be discharged (FIG. 10, position E).

When the cartridge is to be replaced, a user lifts the lever arm, and the cam catches the cartridge for initial venting (FIG. 10, position F). The initial venting helps adjust the pressure in the cartridge to the atmospheric pressure of the user. This movement breaks the sealing mechanism between the cartridge nozzle and the appliance and moves the cartridge axially away from the cartridge puncture mechanism. Undesired ejection of a discharged cartridge may be prevented by venting during the transition from discharge to open or transition from discharge to eject while the aperture is partially restricted by the lever arm.

Figure 13:
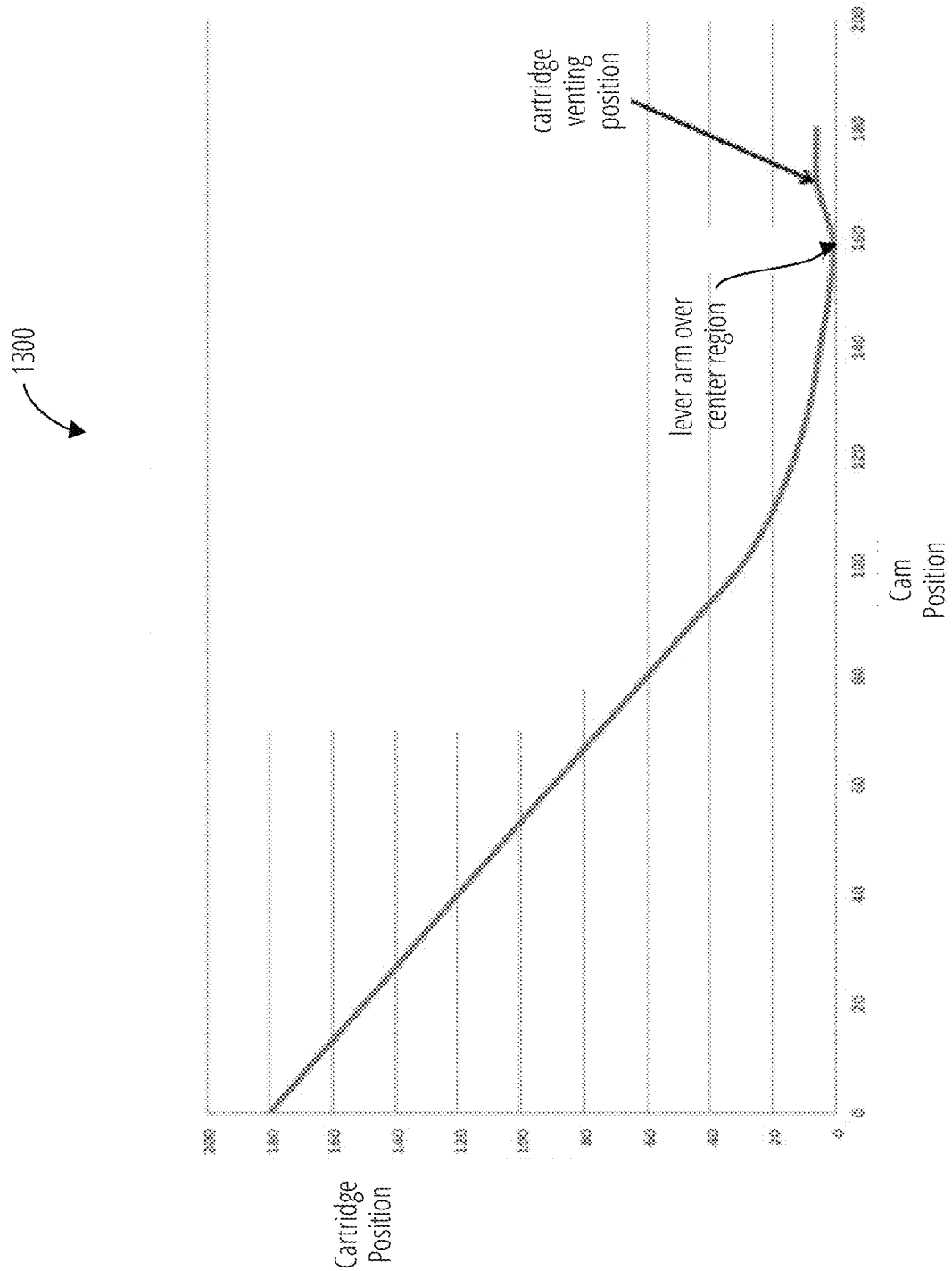
FIG. 13 illustrates an actuation profile 1300 in accordance with one embodiment.

As the lever arm is lifted, the cartridge moves to a fully vented position (FIG. 10, position G). In an embodiment, the cam profile may provide asymmetric movement of the cartridge such that the cartridge will not perform the venting when transitioning from open to discharge but will perform the venting when transitioning from discharge to open. In the actuation profile 1300 of FIG. 13, the cam profile transitions to an acute slope when passing the over-center position as described herein. When the cam is moved from the open position to the discharge position, the cartridge position will track with the cam position. When moving from the discharge position, the acute slope of the cam will cause the cam to engage the top of the cartridge and tilt the cartridge.

In one embodiment, an additional discrete cam position for venting can be provided where the pressure is equalized through gas release as above. The housing base end aperture in the cartridge loader housing and lever arm assembly may be made such that a cartridge entering the housing base end aperture will be properly positioned for discharge. Cartridges can exit the housing base end aperture to be removed or replaced. In some embodiments the housing base end aperture may have a housing interior narrowed region where the ejection or insertion has a slight mechanical force to overcome. In some embodiments the housing interior narrowed region does not interfere with the cartridge insertion or ejection and no interference force is created.

These and other embodiments as will be evident upon study and review of the present disclosure are envisioned as equivalent embodiments to the various embodiments disclosed herein.

What is claimed is:

1. An apparatus for holding a cartridge, the apparatus comprising:
   a lever arm comprising a handle, a hinge axle and a cam centered on the hinge axle; and
   a housing for receiving the cartridge, the housing having a first end and a second end, the first end adapted to connect to an appliance, and the second end adapted to allow the lever arm to open and close, the housing having an aperture exposing an interior of the housing, the aperture shaped to receive the cartridge and the lever arm;
   wherein the cam is adapted to assist in seating the cartridge in the housing when the lever arm is closed, and ejecting the cartridge when the lever arm is opened; and
   wherein the second end further comprising a flex tab capable of engaging the lever arm and securing the lever arm in a fixed position.

2. The apparatus as described in claim 1, wherein the lever arm further comprises an over center region defined by the cam and the lever arm.

3. The apparatus as described in claim 1, wherein the lever arm further comprises a prong for ejecting the cartridge when the lever arm is in an open position.

4. The apparatus of claim 1, wherein the cam moves the cartridge from being aligned with the housing to being out of alignment with respect to the housing.

5. The apparatus of claim 1, where the lever arm may be actuated to a position over 180 degrees between an open position and a closed position.

6. The apparatus of claim 1, wherein the fixed position is a closed position.

7. The apparatus of claim 1, wherein the first end connects to the appliance.

8. The apparatus of claim 1 wherein the lever arm and the housing are injection molded.

9. The apparatus of claim 1, wherein the lever arm and the housing are 3D printed.

10. The apparatus of claim 1, wherein the housing further comprises a pair of recesses, apertures, notches or pins for receiving the hinge axle.

11. The apparatus of claim 1, wherein the appliance is a device used in the preparation of food and food products.

12. An apparatus for holding a cartridge, the apparatus comprising:
    a lever arm comprising a handle, a hinge axle and a cam centered on the hinge axle; and
    a housing for receiving the cartridge, the housing having a first end and a second end, the first end adapted to connect to an appliance, and the second end adapted to allow the lever arm to open and close, the housing having an aperture exposing an interior of the housing, the aperture shaped to receive the cartridge and the lever arm;
    wherein the cam is adapted to assist in seating the cartridge in the housing when the lever arm is closed, and ejecting the cartridge when the lever arm is opened; and
    wherein the second end further comprising a flex tab capable of engaging the lever arm and securing the lever arm in a closed position.

13. The apparatus as described in claim 12, wherein the lever arm further comprises an over center region defined by the cam and the lever arm.

14. The apparatus as described in claim 12, wherein the lever arm further comprises a prong for ejecting the cartridge when the lever arm is in an open position.

15. The apparatus of claim 12, wherein the cam moves the cartridge from being aligned with the housing to being out of alignment with respect to the housing.

16. The apparatus of claim 12, where the lever arm may be actuated to a position over 180 degrees between an open position and a closed position.

17. The apparatus of claim 12, wherein the first end connects to the appliance.

18. The apparatus of claim 12, wherein the housing further comprises a pair of recesses, apertures, notches or pins for receiving the hinge axle.

* * * * *